(12) United States Patent
Wang et al.

(10) Patent No.: US 11,524,316 B2
(45) Date of Patent: Dec. 13, 2022

(54) TWO-DIMENSIONAL COORDINATION POLYMERS

(71) Applicant: Arizona Board of Regents on behalf of Arizona State University, Scottsdale, AZ (US)

(72) Inventors: Meng Wang, Tempe, AZ (US); Yuxia Shen, Mesa, AZ (US); Sefaattin Tongay, Tempe, AZ (US); Matthew Green, Phoenix, AZ (US); Ying Qin, Tempe, AZ (US); Sijie Yang, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 427 days.

(21) Appl. No.: 16/778,713

(22) Filed: Jan. 31, 2020

(65) Prior Publication Data
US 2020/0247966 A1    Aug. 6, 2020

Related U.S. Application Data

(60) Provisional application No. 62/800,018, filed on Feb. 1, 2019.

(51) Int. Cl.
*B05D 1/18* (2006.01)
*C08J 7/06* (2006.01)
*B05D 1/38* (2006.01)

(52) U.S. Cl.
CPC ............... *B05D 1/18* (2013.01); *B05D 1/38* (2013.01); *C08J 7/06* (2013.01); *B05D 2201/02* (2013.01); *B05D 2252/02* (2013.01); *C08J 2325/06* (2013.01); *C08J 2367/02* (2013.01); *C08J 2383/04* (2013.01)

(58) Field of Classification Search
None
See application file for complete search history.

(56) References Cited

U.S. PATENT DOCUMENTS

| 9,362,365 B2 | 6/2016 | Hebard et al. | |
| 2007/0020388 A1* | 1/2007 | Huang | G02B 1/115 427/430.1 |
| 2009/0042000 A1* | 2/2009 | Schubert | C07C 51/418 556/40 |

(Continued)

OTHER PUBLICATIONS

Z.-G. Gu, J. Zhang / Coordination Chemistry Reviews 378 (2019) 513-532, available online Oct. 26, 2017.*

(Continued)

*Primary Examiner* — James M Mellott
(74) *Attorney, Agent, or Firm* — Fish & Richardson P.C.

(57) ABSTRACT

Forming a two-dimensional polymeric sheet includes translating a portion of a flexible substrate through a first liquid precursor to coat the portion of the flexible substrate with the first liquid precursor, thereby yielding a precursor-coated portion of the flexible substrate. The precursor-coated portion of the flexible substrate is translated through an interface between the first liquid precursor and a second liquid precursor, thereby reacting the first liquid precursor on the precursor-coated portion of the flexible substrate with the second liquid precursor to yield a polymer-coated portion of the flexible substrate.

19 Claims, 2 Drawing Sheets

(56) References Cited

U.S. PATENT DOCUMENTS

2019/0185705 A1* 6/2019 Wengeler .............. C09D 5/00
2019/0276476 A1 9/2019 Shan et al.
2020/0331843 A1 10/2020 Green et al.

OTHER PUBLICATIONS

U.S. Appl. No. 16/872,142, filed May 11, 2020, Mu et al.
Kumar et al., "Scalable enhancement of graphene oxide properties by thermally driven phase transformation," Nat Chem., 2014, 6:151-158, doi:10.1038/nchem.1820.
Miao et al., "High Efficiency Graphene Solar Cells by Chemical Doping," Nano Letters. 2012, 12:2745-2750, doi:10.1021/nl204414u.
Tongay et al., "Rectification at Graphene-Semiconductor Interfaces: Zero-Gap Semiconductor-Based Diodes," Physical Review, 2012, 2(011002): 10 pages, doi:10.1103/PhysRevX.2.011002.

* cited by examiner $D_o$ = Defect density
$d$ = thickness

TWO-DIMENSIONAL COORDINATION POLYMERS

CROSS-REFERENCE TO RELATED APPLICATION

This application claims the benefit of U.S. Patent Application No. 62/800,818 entitled "TWO-DIMENSIONAL COORDINATION POLYMERS" and filed on Feb. 1, 2019, which is incorporated by reference herein in its entirety.

TECHNICAL FIELD

This invention relates to roll-to-roll manufacturing of two-dimensional coordination polymers with controlled thickness, size, and quality.

BACKGROUND

Manufacturing of two-dimensional (2D) polymers onto substrates can be achieved by creating bulk crystals of layered polymers followed by exfoliation or by "bottom up" synthesis methods. These methods typically yield 2D polymers having dimensions far less than 1 $cm^2$, and control of thickness, material crystallinity, and lateral sizes can be difficult to implement.

SUMMARY

In an general aspect, forming a two-dimensional (2D) polymeric sheet includes translating a portion of a flexible substrate through a first liquid precursor to coat the portion of the flexible substrate with the first liquid precursor, thereby yielding a precursor-coated portion of the flexible substrate, and translating the precursor-coated portion of the flexible substrate through an interface between the first liquid precursor and a second liquid precursor, thereby reacting the first liquid precursor on the precursor-coated portion of the flexible substrate with the second liquid precursor to yield a polymer-coated portion of the flexible substrate.

Implementations of the general aspect may include one or more of the following features.

Forming the 2D polymeric sheet may further include translating the polymer-coated portion of the flexible substrate through the second liquid precursor. The polymer-coated portion of the flexible substrate may be translated through the interface between second liquid precursor and the first liquid precursor. The polymer-coated portion of the flexible substrate may be translated through the first liquid precursor. The polymer-coated portion of the flexible substrate may be removed from the first liquid precursor. The polymer-coated portion of the flexible substrate may be received on a roll.

Forming the 2D polymeric sheet may include roll-to-roll processing of the flexible substrate. The precursor-coated portion of the flexible substrate may be translated through the interface between the first liquid precursor and the second liquid precursor at a selected speed ranging from 0.001 meters per second to 10 meters per second. The first liquid precursor and the second liquid precursor may be held at a selected temperature ranging from 5° C. to 80° C.

Forming the 2D polymeric sheet may further include translating the precursor-coated portion of the flexible substrate through the interface between the first liquid precursor and the second liquid precursor at a selected angle with respect to the interface ranging from 20° to 70°. In some cases, forming the 2D polymeric sheet further includes translating the precursor-coated portion of the flexible substrate through an interface between the first liquid precursor and the second liquid precursor for a selected number of times. In certain cases, forming the 2D polymeric sheet further includes treating the flexible substrate to selectively coat the flexible substrate with the first liquid precursor. Treating the flexible substrate may include altering a surface energy or crystallinity of the flexible substrate.

The polymer is a 2D polymer (e.g., a 2D coordination polymer). The polymer may include a degree (e.g., a non-zero degree) of crystallinity. The surface energy of the flexible substrate can exceed the surface energy of the first liquid precursor, the second liquid precursor, and the two-dimensional polymeric sheet. The flexible substrate typically includes a first region and a second region, and the surface energy of the first region exceeds the surface energy of the first liquid precursor, the second liquid precursor, and the two-dimensional polymeric sheet, which exceed the surface energy of the second region.

In some implementations, the first liquid precursor includes a metal acetylacetonate salt and ethyl acetate. In certain implementations, the second liquid precursor includes hexaaminobenzene, octaaminonaphthalene, or both.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1:
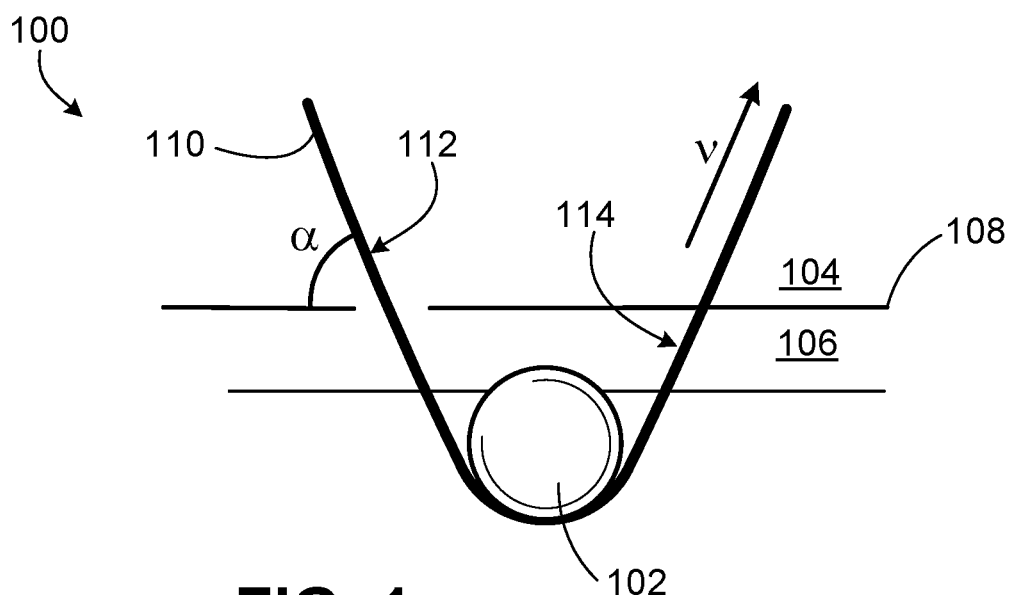
FIG. 1 depicts formation of two-dimensional coordination polymers in a roll-to-roll apparatus.

FIG. 1 depicts a portion of apparatus 100 for roll-to-roll manufacturing of two-dimensional (2D) coordination polymers. As used herein, "two-dimensional polymer" generally refers to a sheet-like monomolecular macromolecule having, consisting of, or consisting essentially of laterally connected repeat units with end groups along all edges. As used herein, "coordination polymer" generally refers to an inorganic or organometallic polymer structure containing metal cation centers linked by organic ligands. In one example, the apparatus includes winding rollers and receiving rollers controlled by a stepping motor to operate at the same speed. The rollers are typically chemically inert. Suitable chemically inert materials include TEFLON, MACOR, metal based rollers, and other dielectrics.

Apparatus 100 includes deposition roller 102 in a vessel that contains first liquid precursor 104 and second liquid precursor 106 that are insoluble in each other, with interface 108 between first liquid precursor 104 and second liquid precursor 106. Polymer formation occurs on flexible substrate 110 that is translated at an angle α through interface 108 between first liquid precursor 104 and around deposition roller 112 in second liquid precursor 106. Flexible substrate 110 is formed of a material that is compatible with first liquid precursor 104 and second liquid precursor 106. Examples of polymeric materials for flexible substrate 110 include poly(ethylene terephthalate) (PET), polydimethylsiloxane (PDMS), polystyrene (PS), and other solid polymeric substrates. Flexible substrate 110 may be selected such that a surface energy of the flexible substrate achieves a desired effect on polymerization kinetics of the polymer. As described herein, process parameters may be selected to yield desired properties of the resulting 2D polymers, including polymer thickness and material quality.

2D or layered polymers are formed when flexible substrate 110 translates through interface 108 between first liquid precursor 104 and second liquid precursor 106. The arrow in FIG. 1 shows the direction in which a portion of flexible substrate 110 translates after passing from first liquid precursor 104 into second liquid precursor 106, then back through the first liquid precursor. As flexible substrate 110 is drawn at a speed v through first liquid precursor 104 toward interface 108, a thin coating 114 of first liquid precursor 104 is formed on the flexible substrate. First liquid precursor coating 114 on flexible substrate 110 acts as a precursor for polymerization. A thickness of first liquid precursor coating 114 is influenced by a speed v of flexible substrate 110, a surface energy of the flexible substrate, and a concentration of first liquid precursor 104 in solution. As flexible substrate 110 enters second liquid precursor 106 at angle α, the second liquid precursor reacts with first liquid precursor coating 114 on flexible substrate 110 to form a 2D coordination polymer 116 on the flexible substrate. As first liquid precursor coating 114 contacts second liquid precursor 106, polymerization occurs on flexible substrate 110. Here, the speed v and concentration of second liquid precursor 106 influences the degree of crystallinity of the resulting 2D coordination polymer 116. As used herein, "degree of crystallinity" generally refers to how well crystallized the 2D polymers are, which will impact the resulting properties of the polymer, such as thermal stability, optoelectronic characteristics, and conductivity.

Based at least in part on the difference in surface energy between the first liquid precursor and the flexible substrate, a thickness of the first liquid precursor coating on the flexible substrate and an overall thickness of the resulting 2D polymer can be controlled. If the difference in surface energy is high, the first liquid precursor will adhere to the flexible substrate and will be relatively thin, thereby promoting substantially uniform crystallization.

In one example, the second liquid precursor (bottom phase) includes hexaaminobenzene (HAB) or octaaminonaphthalene (OAN) dissolved in deoxygenated deionized water (10 mM). Preparation under inert gas conditions (e.g., Ar or $N_2$) can prevent oxidization. $Na_2CO_3$ (10 mM) and NaBr (2.5 mM), which serve as activators, can be added to pre-prepare the ligand for metal coordination. The first liquid precursor (top phase) can be formed by dissolving about 10 mg of $M(acac)_2$, where "M" represents a transition metal atom and "acac" represents acetylacetonate, in 120 μM of ethyl acetate (EtOAc). These solutions are insoluble and form a 2D interface at which the $M(acac)_2$ can be reduced. Subsequently, a single M transition metal atom binds to the anchor sites of HAB or OAN. This process reduces six anchorage sites to three sites (i.e., two amines from HAB or OAN coordinate one metal atom) to yield a 2D coordination polymer with 3-fold crystal symmetry. The 2D polymer forms at the 2D interface. As such, the roller design promotes large-scale manufacturing of 2D coordination polymers. Two monomers and a generic $M(acac)_2$ salt are given as an example here, but the roll-to-roll manufacturing process is suitable for other monomers and metal atoms.

In some embodiments, an apparatus for roll-to-roll manufacturing of 2D polymers includes two or more rollers, with some of the rollers positioned in the first liquid precursor and some of the rollers positioned in the second liquid precursor. In some cases, the rollers are alternately positioned in the first liquid precursor and the second liquid precursor. Each additional roller provides an additional deposition surface, thereby increasing the thickness of the resulting 2D polymer.

Figure 2:
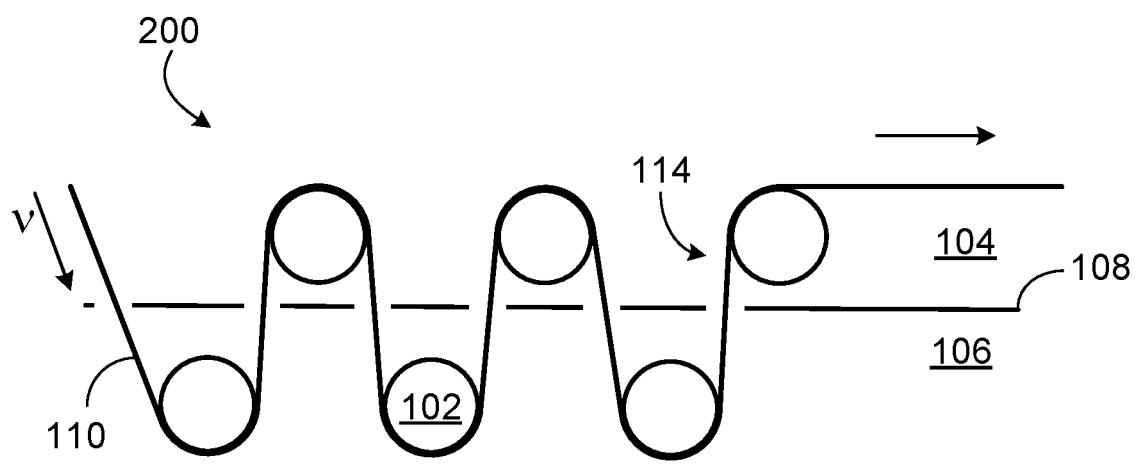
FIG. 2 depicts an apparatus and process for roll-to-roll synthesis and collection of two-dimensional coordination polymers.

FIG. 2 depicts a portion of roll-to-roll apparatus 200 with six deposition rollers 102.

The speed v at which flexible substrate 110 is translated through the liquid precursors 104, 106 may be selected to achieve a desired thickness, continuity, or crystallinity of the resulting 2D polymer 116. A thickness of a 2D polymer formed with translation of flexible substrate 110 through the interface 108 at a lesser speed typically exceeds a thickness of a 2D polymer formed with translation of the flexible substrate through the interface at a greater speed. In some cases, rapid translation may yield 2D polymers with a monolayer thickness. In this high speed limit, however, the deposition process may cease when v exceeds the polymerization speed (growth rate), and the limited time for polymerization may yield polymers of reduced crystallinity due at least in part to insufficient time for proper polymerization.

Growth temperature ($T_{growth}$) and activator concentration ($C_{act}$) also influence the properties of the resulting 2D polymers. As used herein, "activator" generally refers to a chemical component that increases the rate of the polymerization reaction that occurs during the two-phase synthesis at the interface or on flexible substrates. Suitable activators include NaCl, $NaHCO_3$, and NaOH at concentrations ranging from 1 millimolar (mM) to 20 mM. The activator modifies the activation energy that must be overcome to enable polymerization at the interface, thereby increasing the speed of the polymerization reaction. As such, growth of the polymer ("growth speed") can be controlled by selecting activator concentration. In general, a greater $C_{act}$ increases the reaction rate and yields higher quality, thicker 2D polymer sheets. An increase in growth temperature $T_{growth}$ can also increase the growth speed, and thereby yield higher quality, thicker sheets.

Figure 3A:
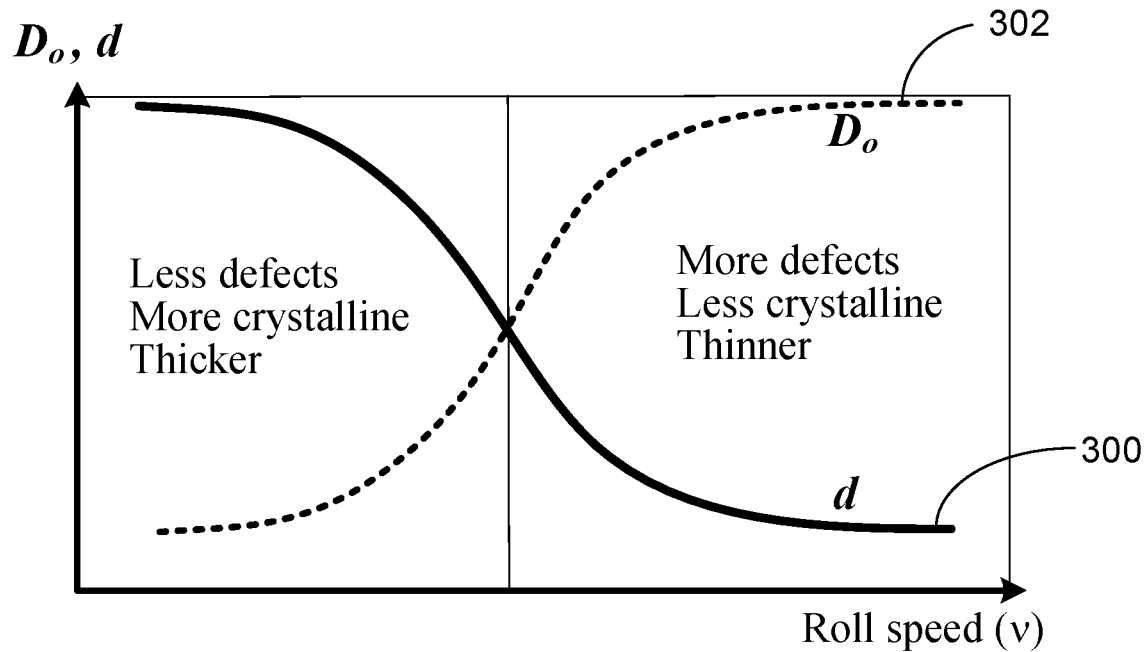
FIGS. 3A and 3B show effects of manufacturing parameters on the properties of two-dimensional (2D) coordination polymers.
Figure 3B:
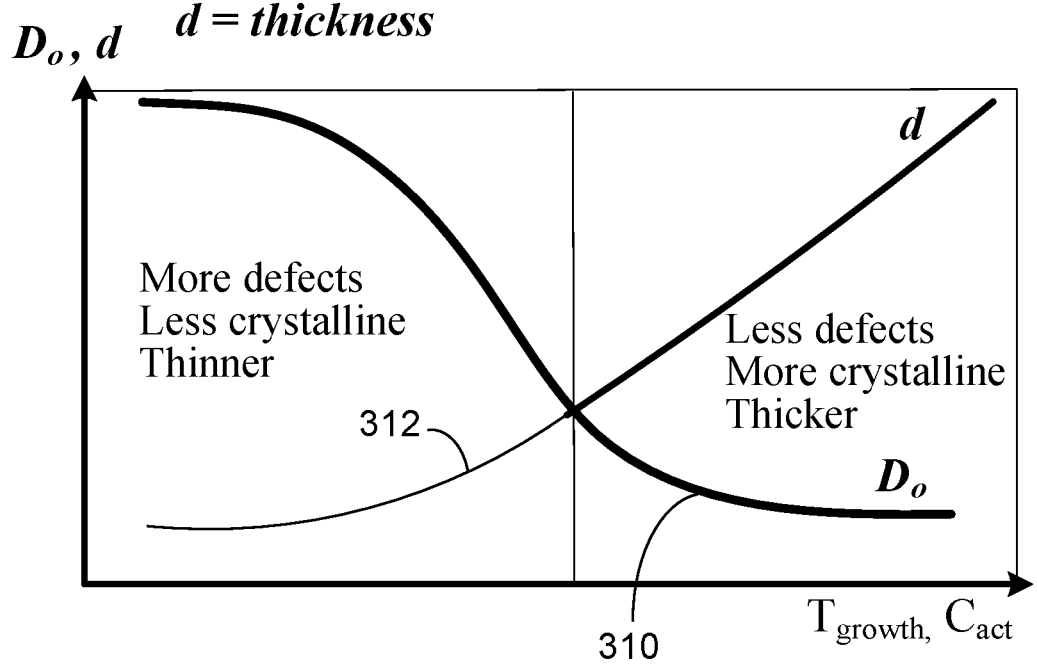

FIG. 3A shows the effect of roll speed (v) on defect density ($D_o$) and thickness (d) of the resulting 2D polymer. Plot 300 shows a decrease in thickness (d) as roll speed increases, and plot 302 shows a an increase in defect density ($D_o$) as roll increases. FIG. 3B shows the effect of growth temperature ($T_{growth}$) and activator concentration ($C_{act}$) on defect density ($D_o$) and thickness (d) of the resulting 2D polymer. Plot 310 shows a decrease in defect density ($D_o$) as growth temperature ($T_{growth}$) and activator concentration ($C_{act}$) increase, and plot 312 shows an increase in thickness (d) as growth temperature ($T_{growth}$) and activator concentration ($C_{act}$) increase.

The angle (α) of the flexible substrate with respect to the interface is a factor in deposition and collection efficiency of the 2D polymer on the flexible substrate. When α is acute (α<30°), polymer collected at the interface typically adheres well to the flexible substrate. As the flexible substrate translates through the vessel, polymer continues to deposit on the flexible substrate. As α approaches 90°, it becomes more difficult to optimize surface adhesion, and process becomes less reproducible.

In some cases, selective deposition of 2D polymers can be achieved. In one example, 2D polymers can be deposited onto preselected regions of the flexible substrate. By introducing crystalline defects, changing surface chemistry of flexible substrate, or the like, the surface energy of the flexible substrate ($E_{surface}$) can be designed or engineered to yield an engineered surface energy ($E_{surface}^{engineered}$) that can adhere to or repel the first liquid precursor. Regions of the flexible substrate with high surface energy that adhere to the first liquid precursor allow 2D polymer deposition. The engineered surface energy ($E_{surface}^{engineered}$) the surface energy of the roller substrate ($E_{surface}^{substrate}$) and the surface energy of the liquid precursors ($E_{surface}^{phase}$) can be selected to achieve conditions for selective deposition. Selective deposition condition can occur when: $E_{surface}^{engineered} > E_{surface}^{phase} > E_{surface}^{substrate}$.

Full area deposition can occur when $E_{surface}^{substrate\ or\ engineered} > E_{surface}^{phase}$.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of forming a two-dimensional polymeric sheet, the method comprising:
    translating a portion of a flexible substrate through a first liquid precursor to coat the portion of the flexible substrate with the first liquid precursor, thereby yielding a precursor-coated portion of the flexible substrate; and
    translating the precursor-coated portion of the flexible substrate through an interface between the first liquid precursor and a second liquid precursor, thereby reacting the first liquid precursor on the precursor-coated portion of the flexible substrate with the second liquid precursor to yield a polymer-coated portion of the flexible substrate, wherein the second liquid precursor comprises hexaaminobenzene or octaaminonaphthalene.

2. The method of claim 1, further comprising translating the polymer-coated portion of the flexible substrate through the second liquid precursor.

3. The method of claim 2, further comprising translating the polymer-coated portion of the flexible substrate through the interface between second liquid precursor and the first liquid precursor.

4. The method of claim 3, further comprising translating the polymer-coated portion of the flexible substrate through the first liquid precursor.

5. The method of claim 4, further comprising removing the polymer-coated portion of the flexible substrate from the first liquid precursor.

6. The method of claim 5, further comprising receiving the polymer-coated portion of the flexible substrate on a roll.

7. The method of claim 1, wherein the method comprises roll-to-roll processing of the flexible substrate.

8. The method of claim 1, further comprising translating the precursor-coated portion of the flexible substrate through the interface between the first liquid precursor and the second liquid precursor at a selected speed ranging from 0.001 meters per second to 10 meters per second.

9. The method of claim 1, wherein the first liquid precursor and the second liquid precursor are held at a selected temperature ranging from 5° C. to 80° C.

10. The method of claim 1, further comprising translating the precursor-coated portion of the flexible substrate through the interface between the first liquid precursor and the second liquid precursor at a selected angle with respect to the interface ranging from 20° to 70°.

11. The method of claim 1, further comprising translating the precursor-coated portion of the flexible substrate through an interface between the first liquid precursor and the second liquid precursor for a selected number of times.

12. The method of claim 1, further comprising treating the flexible substrate to selectively coat the flexible substrate with the first liquid precursor.

13. The method of claim 12, wherein treating the flexible substrate comprises altering a surface energy or crystallinity of the flexible substrate.

14. The method of claim 1, wherein the polymer is a two-dimensional polymer.

15. The method of claim 14, wherein the polymer is a two-dimensional coordination polymer.

16. The method of claim 1, wherein the surface energy of the flexible substrate exceeds the surface energy of the first liquid precursor, the second liquid precursor, and the two-dimensional polymeric sheet.

17. The method of claim 1, wherein the flexible substrate comprises a first region and a second region, and the surface energy of the first region exceeds the surface energy of the first liquid precursor, the second liquid precursor, and the two-dimensional polymeric sheet, which exceed the surface energy of the second region.

18. The method of claim 1, wherein the polymer comprises a degree of crystallinity.

19. The method of claim 1, wherein the first liquid precursor comprises a metal acetylacetonate salt and ethyl acetate.

* * * * *